Feb. 11, 1930.  H. L. HAMMOND  1,746,349
AUTOMOBILE BODY
Filed Feb. 16, 1926   2 Sheets-Sheet 1
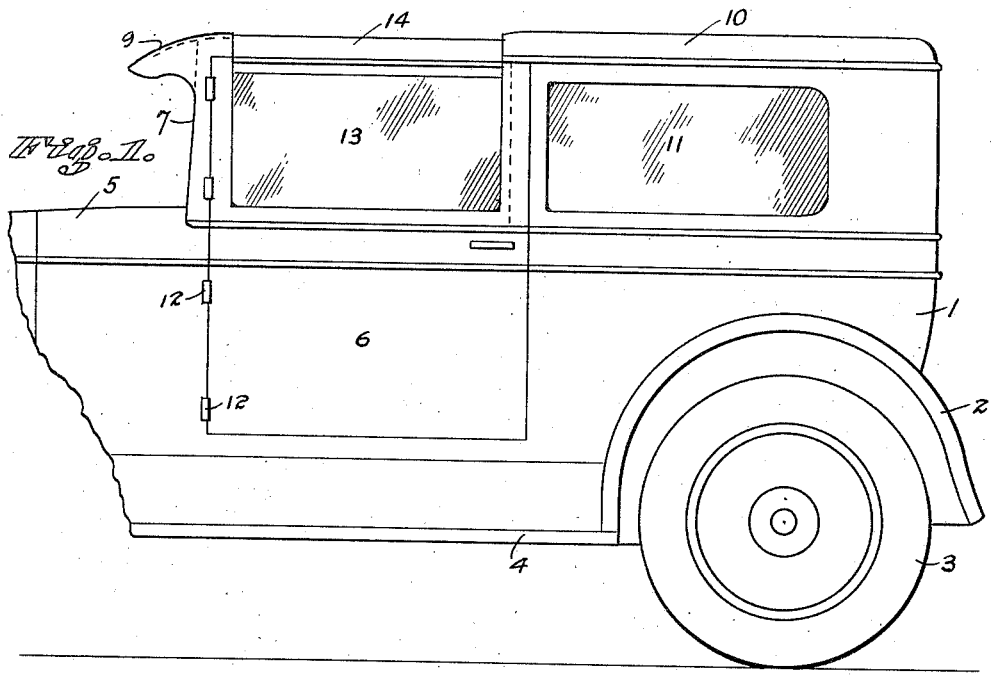
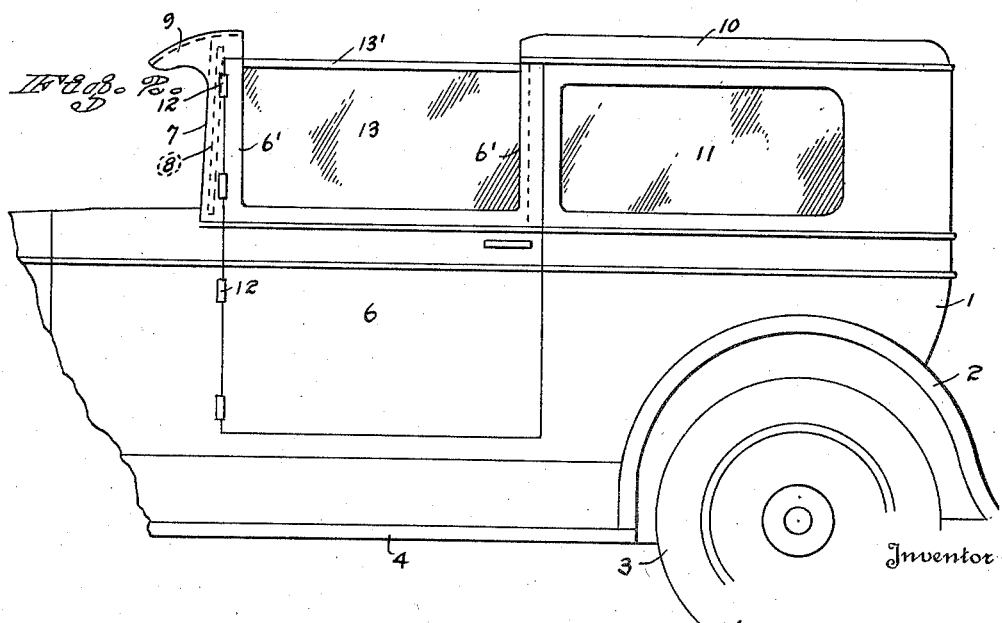
Inventor
HAROLD L. HAMMOND
By Miller & Boyken
Attorneys Feb. 11, 1930.　　　H. L. HAMMOND　　　1,746,349
AUTOMOBILE BODY
Filed Feb. 16, 1926　　2 Sheets-Sheet 2
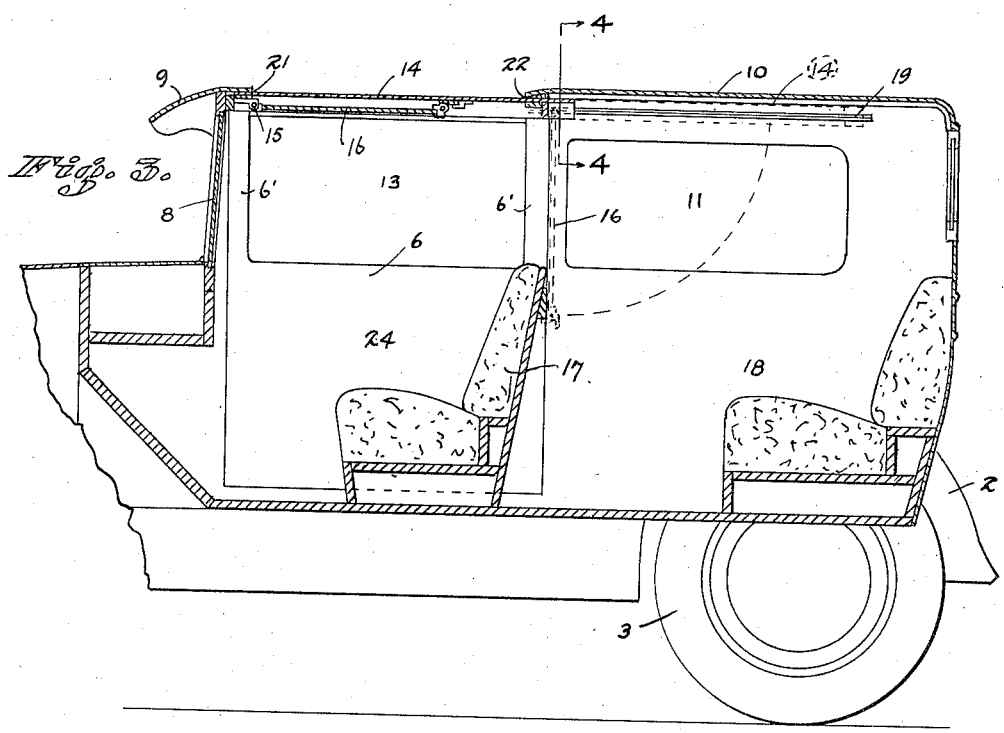
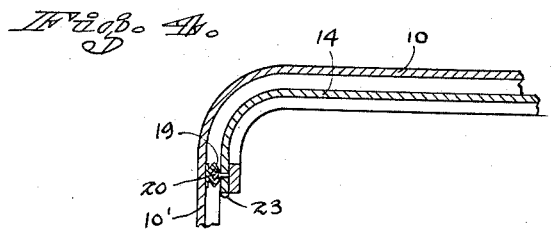
Inventor
HAROLD L. HAMMOND.
By Miller & Boyken
Attorneys Patented Feb. 11, 1930

1,746,349

UNITED STATES PATENT OFFICE

HAROLD L. HAMMOND, OF OAKLAND, CALIFORNIA

AUTOMOBILE BODY

Application filed February 16, 1926. Serial No. 88,521.

This invention relates to passenger automobiles of the closed body type and has for its object improvements in such bodies whereby the vehicle may be quickly changed from a closed to an open type, together with various details of construction contributing thereto as will appear in the following specification:

In the drawings hereto the preferred manner of carry out my invention is shown tho it is understood that I do not limit myself to such precise construction but include any modifications thereof falling within the scope of my invention.

Figure 1 is a side elevation of the central and rear portion of an automobile showing the vehicle as having a body of the closed coach type.

Figure 2 is a view similar to Figure 1 but showing the top arranged as an open type body.

Figure 3 is a longitudinal vertical section of Figure 1 showing the inner construction of the top and relation of the auxiliary windshield to the front seat.

Figure 4 is an enlarged section of the top along the line 4—4 of Figure 3.

Briefly described, my improvements consist of a closed type body having a displaceable forward section which when displaced converts the car substantially into an open model.

In the drawings of the vehicle, the lower part 1 of the body, rear fender 2, wheel 3, runboard 4 and hood 5 are all of well known design and construction and the vehicle is here shown as of the coach type having one door 6 at each side of the body, tho it is to be understood that my improvements described hereunder may be applied to an automobile body having any number of doors.

A permanent frame 7 at the forward end of the driver's compartment 24 supports the usual windshield 8 and visor 9, while the rearward portion 10 of the top is of any approved permanent construction provided with any desired window arrangement as at 11.

This permanent top 10 extends forwardly and terminates at a point just forward of the opening for the doors 6 as more clearly shown in Figure 2.

The doors 6 are preferably hinged at the forward edge as indicated at 12 and comprise each a lower body portion with two stanchions 6' arising therefrom but preferably free of any upper lateral piece as heretofore provided to form a window frame.

The doors are provided with a plate of glass 13 arranged to slide up and down in the door in the manner well known, and this glass is preferably tho not necessarily bound with a metal strip as at 13'.

Normally the space between the forward termination of the permanent portion 10 of the top and the windshield frame is bridged by a displaceable top section 14 to complete the structure as a closed top.

This section 14 of the top is displaceable rearwardly within the permanent section 10 so as to leave the front entirely open as shown in Figure 2, thus when the windows 13 and 11 are also lowered the car is transformed into an open model.

On section 14 is pivotally mounted at 15 an auxiliary glass windshield 16 adapted to be latched in horizontal position against the under side of the top as shown in Figure 3 in full lines, or to swing down to latch against the rear of the front seat 17 when the top section 14 is rearwardly displaced, all as indicated by the dotted representation of these members in Figure 3, thus also affording the means of completely enclosing the rear compartment 18 if desired.

The displacement of section 14 of the top may be effected through various constructions tho in the drawings I have shown it as slidable on tracks or channel shaped guides 19 secured to opposite side walls 10' of the permanent section, the slidable section having secured to its shoes 20 engaging the guides.

When the slidable section 14 is drawn forward it engages tightly under the rearwardly extending edge of the visor and any suitable weather strips are provided at this point 21 as well as at the point 22, of forward termination of the permanent top section 10, to effect a proper seal, also it is understood without unnecessary illustration of well known details that any suitable latches or hooks are used to hold the parts either open or closed.

The sliding section 14 extends laterally beyond the glass 13 of the front door and preferably seals lightly thereagainst by means of a tubular rubber sealing strip indicated at 23 in Figure 4.

I claim:

1. In an automobile of the character described, a permanent windshield frame at the forward end, a permanent top over the rearward end terminating at a point spaced from said frame, an entire displaceable top section adapted to extend from said frame to said permanent top and slidable rearwardly thereunder and an auxiliary windshield carried by said displaceable top section adapted to extend downwardly therefrom so as to isolate the section of the vehicle covered by said top section when slid rearwardly.

2. In a structure as specified in claim 1 said auxiliary windshield being pivotally mounted under said top section to fold from a horizontal position to a vertical position engaging the back of the forward seat of the vehicle.

HAROLD L. HAMMOND.